United States Patent [19]
Kreuzer et al.

[11] Patent Number: 5,901,976
[45] Date of Patent: May 11, 1999

[54] AIRBAG LID

[75] Inventors: Martin Kreuzer, Kleinwallstadt; Albrecht Hufgard, Erlenbach; Stefan Bohn, Goldbach, all of Germany

[73] Assignee: TRW Automotive Safety Systems GmbH, Aschaffenburg, Germany

[21] Appl. No.: 08/839,089

[22] Filed: Apr. 23, 1997

[30] Foreign Application Priority Data

Apr. 27, 1996 [DE] Germany .......................... 196 16 942

[51] Int. Cl.⁶ .................................................. B60R 21/16
[52] U.S. Cl. ........................ 280/728.3; 280/731; 280/732
[58] Field of Search ................................. 280/728.3, 731, 280/732

[56] References Cited

U.S. PATENT DOCUMENTS 4,097,064  6/1978  Ikawa et al. ........................ 280/728.3
5,082,310  1/1992  Bauer ................................... 280/728.3

FOREIGN PATENT DOCUMENTS 3918281  12/1990  Germany .
4306149   9/1994  Germany .
2287226   9/1995  United Kingdom .

*Primary Examiner*—Kenneth R. Rice
*Attorney, Agent, or Firm*—Sprung Kramer Schaefer & Briscoe

[57] ABSTRACT

A lid (1) for an airbag accommodated in the instrument panel of a motor vehicle. For economy and simplicity of manufacture it is made of a relatively hard plastic. It is characterized in that it comprises a lower layer (2) of soft and resilient plastic and an outer layer (3) of hard plastic and in that both layers (2 & 3) are essentially fastened together adhering totally surface to surface. The outer layer (3) can be made of a plastic that matches the material of the surface of the instrument panel in appearance, feel, and acoustics.

17 Claims, 1 Drawing Sheet

AIRBAG LID

BACKGROUND OF THE INVENTION

The present invention concerns a lid for an airbag accommodated in the instrument panel of a motor vehicle.

Lids of this genus are for reasons of function and esthetics adapted to their environment with respect to the design of their materials and exterior, meaning that they are as unremarkable a part of the wall of the instrument panel facing the passengers as possible. The panels usually have a textured and leatherlike surface that, although relatively soft itself, constitutes the skin of a hard molding of injected plastic. The lids themselves accordingly have a hard and dimensionally stable core and a soft exterior.

Instrument panels of this genus are themselves standard equipment, even in many small automobiles, although their manufacture requires considerable expenditure. In the course of radically decreasing the costs of producing motor vehicles accordingly, recourse has been had with respect to many less expensive vehicle models to producing the instrument panels in one piece out of a comparatively hard plastic, which is essentially simpler from the aspect of manufacturing technology although it necessarily results in a hard surface that does not match most of the lids so far employed. The lid should, however, match the instrument panel in these cases as well.

There is also the problem that hard plastics tend to splinter when an airbag suddenly inflates and the lid pivots out. Since the release of fragments absolutely must be prevented in view of the associated risk of injury, the plastics employed for hard instrument panels are entirely inappropriate for manufacturing airbag lids. It is accordingly very difficult to match the lid to the instrument panel as required.

There accordingly exists a need for an airbag lid of the aforementioned genus that cannot be differentiated from the surrounding instrument panel and that will not splinter when the airbag is actuated and break down into fragments that fly around out of control.

SUMMARY OF THE INVENTION

This object is attained in accordance with the present invention in an airbag lid characterized in that it comprises a lower layer of soft and resilient plastic and an outer layer of hard plastic and in that both layers are essentially fastened together adhering totally surface to surface.

Due to the total surface-to-surface adhesion of the soft and resilient lower layer to the outer layer, even though the hard outer layer can break and fragment, all the fragments will remain adhering to the lower layer and can cause no injuries.

The airbag lid in accordance with the present invention is particular characterized in that the outer layer is made of a plastic that matches the material of the surface of the instrument panel in appearance, feel, and acoustics.

Modifications and further embodiments of the present invention are disclosed herein.

Further details will now be specified with reference to the embodiment illustrated by way of example in the drawing wherein:

DETAILED DESCRIPTION OF THE INVENTION

Figure 1:
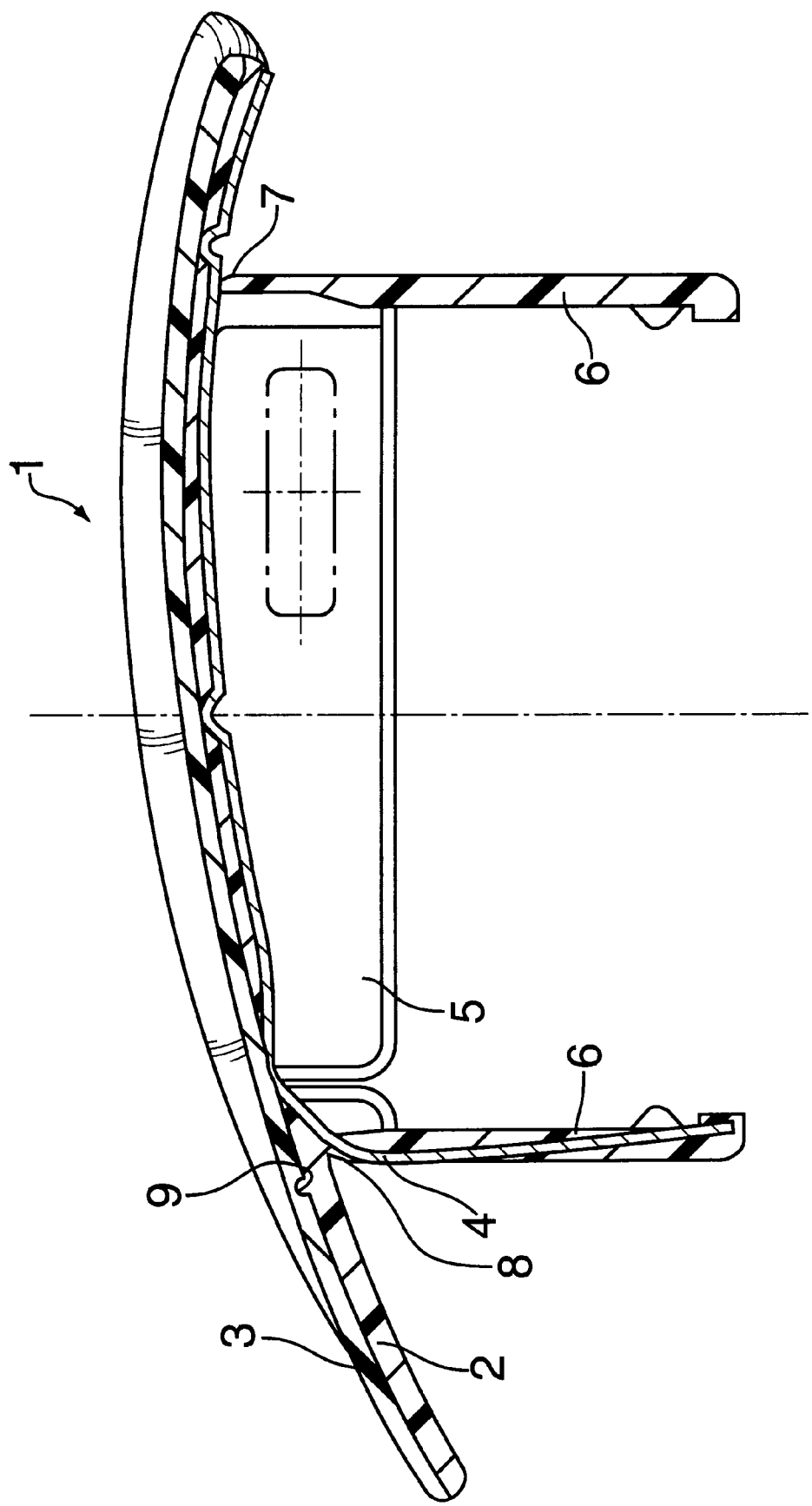
FIG. 1 is a section through an airbag lid according to the invention.

FIG. 1 is a transverse section through an airbag lid 1 in accordance with the present invention. It is slightly concavely saddle-shaped perpendicular to the picture plane, matching the configuration of the surrounding instrument panel. Airbag lid 1 comprises a lower layer 2 of soft and resilient plastic and an outer layer 3 of hard plastic. Layers 2 and 3 are in accordance with the present invention essentially fastened together adhering totally surface to surface, ensuring that, if the lid breaks when the airbag is actuated, any fragments will remain adhering to soft lower layer 2 and will not fly around out of control in the interior of the vehicle.

Lower layer 2 is provided with a reinforcement 4 of sheetmetal, textile, wire net, or a similar material that will maintain airbag lid 1 attached as a whole to the instrument panel when it swings up consequent to sudden inflation of the airbag. Reinforcement 4 can be secured directly to the instrument panel or to the inner surface of the vehicle. It can alternatively extend into a mounting web 6 (the one to the left) molded onto the lower layer 2 of airbag lid 1 and constituting a connection between airbag lid 1 and the airbag housing and the instrument panel or the wall of the vehicle. Such versions usually also have framing components 5 and another mounting web 6 at the other end (to the right) that are also integrated into the lower layer by way of a breakoff point 7. Framing components 5 stabilize and position airbag lid 1 in relation to its surroundings.

At the transition between the mounting web (to the left), which also accommodates reinforcement 4, and the lower layer 2 of airbag lid 1 is a bending line 8 represented by a thinning of the material. Bending line 8 operates in conjunction with a breakoff line 9, also represented by a thinning of the material, in outer layer 3 when the airbag inflates and airbag lid 1 swings up.

The airbag lid 1 in accordance with the present invention can easily be adapted to any instrument panel that consists of a relatively hard material and can accordingly be cost-effectively produced because the lid's intimate and total surface-to-surface adhesion to the non-fragmenting material of lower layer 2 will prevent any fragments that break off when the airbag suddenly inflates from flying around. All fragments of harder outer layer 3 will, rather, be securely held in place by softer lower layer 2 and will cause no injuries.

We claim:

1. Lid for an airbag accommodated in an instrument panel of a motor vehicle, the lid comprising: an inner layer of soft and resilient plastic and an outer layer of hard plastic and wherein the inner and outer layers are essentially fastened together adhering totally surface to surface.

2. Lid as in claim 1, wherein the outer layer is made of a plastic that matches a material of a surface of the instrument panel in appearance, feel, and acoustics.

3. Lid as in claim 1, wherein the inner layer is provided with a reinforcement of sheet metal, textile, or wire net.

4. Lid as in claim 1, further comprising framing components and mounting webs molded onto the inner layer.

5. Lid as in claim 4, further comprising at least one breakoff point at a transition between the inner layer and the framing components or mounting webs.

6. Lid as in claim 1, further comprising at least one bending line in the inner layer and a corresponding breakoff line in the outer layer.

7. Lid as in claim 6, wherein the lid swings up along the bending line when the airbag inflates.

8. Lid as in claim 7, further comprising a reinforcement in the inner layer that acts as a hinge.

9. Lid as in claim 8, further comprising additional bending and breakoff lines in the inner layer and outer layer that act as hinges.

10. Lid as in claim 1, wherein both layers are thermoplastic.

11. Lid as in claim 1, wherein the outer layer has a Shore A hardness higher than 92.

12. Lid as in claim 11, wherein the inner layer has a Shore A hardness lower than 92.

13. Lid as in claim 1, wherein the outer layer comprises polypropylene, polyphenyl oxide, polycarbonate, acrylonitrile butadiene styrene, thermoplastic elastomers, polyamide, and/or copolymers thereof.

14. Lid as in claim 1, wherein the inner layer is of thermoplastic elastomers.

15. Lid as in claim 1, wherein the layers are fastened together by chemical couplings.

16. Lid as in claim 1, wherein the layers are fastened together by mechanical couplings.

17. Lid as in claim 1, wherein the layers are produced by two-component injection molding.

* * * * *